(12) United States Patent
Casetti et al.

(10) Patent No.: US 10,190,515 B2
(45) Date of Patent: Jan. 29, 2019

(54) FUEL VAPOR FLOW ESTIMATION SYSTEMS AND METHODS

(71) Applicant: GM Global Technology Operations LLC, Detroit, MI (US)

(72) Inventors: Martino Casetti, Clarkston, MI (US); Darrell W. Burleigh, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 15/251,806

(22) Filed: Aug. 30, 2016

(65) Prior Publication Data

US 2017/0152802 A1    Jun. 1, 2017

Related U.S. Application Data

(60) Provisional application No. 62/261,592, filed on Dec. 1, 2015.

(51) Int. Cl.
*F02D 41/00* (2006.01)
*F02D 9/02* (2006.01)
(Continued)

(52) U.S. Cl.
CPC ........... *F02D 41/0042* (2013.01); *F02D 9/02* (2013.01); *F02D 41/0007* (2013.01);
(Continued)

(58) Field of Classification Search
CPC ............. F02D 41/0042; F02D 41/0045; F02D 41/1454; F02D 41/1441; F02D 41/0007;
(Continued)

(56) References Cited

U.S. PATENT DOCUMENTS 4,831,537 A    5/1989   Scarnera et al.
5,054,454 A   10/1991   Hamburg et al.
(Continued)

FOREIGN PATENT DOCUMENTS

CN    1601075 A    3/2005
CN   103670816 A    3/2014
(Continued)

OTHER PUBLICATIONS

U.S. Appl. No. 15/251,534, filed Aug. 30, 2016, Casetti et al.
(Continued)

*Primary Examiner* — Hung Q Nguyen
*Assistant Examiner* — Brian P Monahon

(57) ABSTRACT

A control system of a vehicle includes a fuel vapor canister that traps fuel vapor from a fuel tank of the vehicle. A purge valve, when open, allows fuel vapor flow into an intake system of an engine at a first location and, when closed, prevents fuel vapor flow to the intake system of the engine. A purge control module controls opening of the purge valve and determines a fuel vapor flow into cylinders of the engine based on: (i) a first pressure at the first location, (ii) a second pressure at a second location between the purge valve and the intake system, and (iii) at least one delay period between opening of the purge valve and fuel vapor reaching cylinders of the engine.

19 Claims, 8 Drawing Sheets

(51) Int. Cl.
*F02D 41/30* (2006.01)
*F02M 25/08* (2006.01)
*F02D 41/14* (2006.01)
*F02M 35/10* (2006.01)

(52) U.S. Cl.
CPC ..... *F02D 41/0045* (2013.01); *F02D 41/1441* (2013.01); *F02D 41/1454* (2013.01); *F02D 41/3005* (2013.01); *F02M 25/089* (2013.01); *F02M 25/0836* (2013.01); *F02M 25/0854* (2013.01); *F02M 35/1038* (2013.01); *F02D 2200/0406* (2013.01); *F02D 2200/703* (2013.01); *Y02T 10/144* (2013.01)

(58) Field of Classification Search
CPC .................. F02D 41/3005; F02D 9/02; F02D 2200/0406; F02M 25/0836; F02M 35/1038; F02M 25/0854; F02M 25/089; Y02T 10/144
See application file for complete search history.

(56) References Cited

U.S. PATENT DOCUMENTS

| | | | |
|---|---|---|---|
| 5,080,078 A | 1/1992 | Hamburg et al. | |
| 5,267,547 A | 12/1993 | Chikamatsu et al. | |
| 5,273,020 A | 12/1993 | Hayami et al. | |
| 5,275,053 A | 1/1994 | Wlodarczyk et al. | |
| 5,406,828 A | 4/1995 | Hunter et al. | |
| 5,474,049 A * | 12/1995 | Nagaishi | F02D 41/0045 123/520 |
| 5,524,595 A | 6/1996 | Ito et al. | |
| 5,542,286 A | 8/1996 | Wang et al. | |
| 5,554,057 A | 9/1996 | Abe et al. | |
| 5,560,346 A | 10/1996 | Isobe et al. | |
| 5,592,923 A | 1/1997 | MacHida et al. | |
| 5,679,890 A | 10/1997 | Shinohara et al. | |
| 5,726,354 A | 3/1998 | Nomura et al. | |
| 5,739,421 A | 4/1998 | Iochi et al. | |
| 5,765,540 A | 6/1998 | Ishii et al. | |
| 5,845,625 A | 12/1998 | Kidokoro et al. | |
| 5,911,209 A | 6/1999 | Kouda et al. | |
| 5,918,580 A | 7/1999 | Hennrich et al. | |
| 5,967,124 A | 10/1999 | Cook et al. | |
| 6,089,080 A | 7/2000 | Takaku et al. | |
| 6,196,202 B1 | 3/2001 | Busato et al. | |
| 6,227,177 B1 * | 5/2001 | Yamafuji | F02D 41/0042 123/399 |
| 6,257,209 B1 * | 7/2001 | Hyodo | F02D 11/105 123/516 |
| 6,276,343 B1 | 8/2001 | Kawamura et al. | |
| 6,305,361 B1 | 10/2001 | Takaku et al. | |
| 6,761,154 B2 | 7/2004 | Takagi et al. | |
| 7,121,137 B2 | 10/2006 | Hosoya | |
| 8,104,333 B2 | 1/2012 | Takakura | |
| 9,038,489 B2 | 5/2015 | Jackson et al. | |
| 9,316,558 B2 | 4/2016 | Jackson et al. | |
| 9,341,538 B2 | 5/2016 | Horiba | |
| 9,518,540 B2 | 12/2016 | Pearce et al. | |
| 9,562,499 B2 | 2/2017 | Swartz et al. | |
| 9,752,539 B2 | 9/2017 | Burleigh et al. | |
| 9,850,853 B2 * | 12/2017 | Dudar | F02M 25/0809 |
| 2001/0029933 A1 | 10/2001 | Fabre | |
| 2001/0032637 A1 * | 10/2001 | Grieve | F02D 41/0045 123/674 |
| 2002/0139173 A1 | 10/2002 | Kano et al. | |
| 2003/0091443 A1 | 5/2003 | Sabini et al. | |
| 2004/0200271 A1 | 10/2004 | Van Nieuwstadt | |
| 2006/0225713 A1 * | 10/2006 | Kano | F02D 41/0032 123/520 |
| 2007/0227515 A1 * | 10/2007 | Uchida | F02M 25/089 123/520 |
| 2007/0246024 A1 | 10/2007 | Sato et al. | |
| 2008/0178660 A1 | 7/2008 | Bolt et al. | |
| 2009/0277251 A1 | 11/2009 | Takakura et al. | |
| 2010/0070121 A1 | 3/2010 | Ochiai et al. | |
| 2010/0223984 A1 * | 9/2010 | Pursifull | F02M 25/0836 73/114.39 |
| 2010/0224171 A1 | 9/2010 | Peters et al. | |
| 2010/0235072 A1 * | 9/2010 | Okazaki | F02D 41/0042 701/106 |
| 2010/0300413 A1 * | 12/2010 | Ulrey | F02D 9/12 123/518 |
| 2011/0132331 A1 * | 6/2011 | Pursifull | F02B 37/127 123/478 |
| 2011/0197862 A1 | 8/2011 | Der Manuelian et al. | |
| 2011/0307157 A1 * | 12/2011 | Pursifull | F02D 41/0007 701/102 |
| 2011/0315127 A1 | 12/2011 | Jackson et al. | |
| 2012/0097269 A1 | 4/2012 | Horiba et al. | |
| 2013/0213366 A1 * | 8/2013 | Weigl | F02D 29/02 123/520 |
| 2013/0233287 A1 * | 9/2013 | Leone | F02M 25/08 123/520 |
| 2013/0253798 A1 | 9/2013 | Ramappan et al. | |
| 2013/0253799 A1 * | 9/2013 | Peters | F02M 25/0818 701/102 |
| 2014/0005912 A1 * | 1/2014 | Ide | F02D 41/3005 701/104 |
| 2014/0060498 A1 * | 3/2014 | Hasegawa | F02M 25/08 123/520 |
| 2014/0081551 A1 | 3/2014 | Rollinger et al. | |
| 2014/0114550 A1 | 4/2014 | Bohr et al. | |
| 2014/0116399 A1 * | 5/2014 | Ulrey | F02M 25/08 123/520 |
| 2014/0297071 A1 * | 10/2014 | Dudar | F02D 41/22 701/22 |
| 2014/0303830 A1 | 10/2014 | Dudar et al. | |
| 2014/0345574 A1 | 11/2014 | Haefele et al. | |
| 2015/0075251 A1 | 3/2015 | Jentz et al. | |
| 2015/0101328 A1 * | 4/2015 | Surnilla | F02D 41/005 60/599 |
| 2015/0159597 A1 * | 6/2015 | Woods | F02M 25/089 123/495 |
| 2015/0198123 A1 * | 7/2015 | Pearce | B60K 15/03504 123/520 |
| 2015/0308310 A1 * | 10/2015 | Pursifull | F02B 37/127 123/403 |
| 2015/0369141 A1 | 12/2015 | Soliman et al. | |
| 2016/0017849 A1 * | 1/2016 | Shirai | F02D 41/004 123/520 |
| 2016/0108864 A1 * | 4/2016 | Tochihara | F02M 25/089 123/520 |
| 2016/0258389 A1 | 9/2016 | Makino | |
| 2016/0290285 A1 * | 10/2016 | Dudar | F02M 25/089 |
| 2016/0377031 A1 * | 12/2016 | Pursifull | F02M 25/0836 60/602 |
| 2017/0037806 A1 | 2/2017 | Dudar et al. | |
| 2017/0342919 A1 | 11/2017 | Dekar et al. | |

FOREIGN PATENT DOCUMENTS

| | | |
|---|---|---|
| CN | 103899446 A | 7/2014 |
| CN | 104213996 A | 12/2014 |
| JP | 201357261 A | 3/2013 |

OTHER PUBLICATIONS

U.S. Appl. No. 15/251,709, filed Aug. 30, 2016, Casetti et al.
U.S. Appl. No. 15/251,844, filed Aug. 30, 2016, Casetti et al.
First Office Action for Chinese Application No. 201611031940.2 dated Aug. 20, 2018; 7 pages.

* cited by examiner

FUEL VAPOR FLOW ESTIMATION SYSTEMS AND METHODS

CROSS-REFERENCE TO RELATED APPLICATIONS

This application claims the benefit of U.S. Provisional Application No. 62/261,592, filed on Dec. 1, 2015. The disclosure of the above application is incorporated herein by reference in its entirety.

This application is related to U. S. patent application Ser. Nos. 15/251,534 filed on Aug. 30, 2016, 15/251,709 filed on Aug. 30, 2016, and 15/251,844 filed on Aug. 30, 2016. The disclosures of the above applications are incorporated herein by reference in their entirety.

FIELD

The present disclosure relates to internal combustion engines and more specifically to fuel vapor control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. The fuel may be a combination of liquid fuel and vapor fuel. A fuel system supplies liquid fuel and vapor fuel to the engine. A fuel injector provides the engine with liquid fuel drawn from a fuel tank. A vapor purge system provides the engine with fuel vapor drawn from a vapor canister.

Liquid fuel is stored within the fuel tank. In some circumstances, the liquid fuel may vaporize and form fuel vapor. The vapor canister traps and stores the fuel vapor. The purge system includes a purge valve. Operation of the engine causes a vacuum (low pressure relative to atmospheric pressure) to form within an intake manifold of the engine. The vacuum within the intake manifold and selective actuation of the purge valve allows the fuel vapor to be drawn into the intake manifold and purge the fuel vapor from the vapor canister.

SUMMARY

In a feature, a control system of a vehicle is described. A fuel vapor canister traps fuel vapor from a fuel tank of the vehicle. A purge valve, when open, allows fuel vapor flow into an intake system of an engine at a first location and, when closed, prevents fuel vapor flow to the intake system of the engine. A purge control module controls opening of the purge valve and determines a fuel vapor flow into cylinders of the engine based on: (i) a first pressure at the first location, (ii) a second pressure at a second location between the purge valve and the intake system, and (iii) at least one delay period between opening of the purge valve and fuel vapor reaching cylinders of the engine.

In further features, a boost device of an intake system receives air from an air filter and pumps air into an engine of the vehicle. The first location is between the air filter and the boost device. An electrical pump pumps fuel vapor from the fuel vapor canister to the purge valve. The second location is between the purge valve and the electrical pump. A first pressure sensor measures the first pressure at the first location between the air filter and the boost device.

In further features, a second pressure sensor measures the second pressure at the second location between the electrical pump and the purge valve.

In further features, based on the second pressure at the second location, the purge control module controls at least one of (i) opening of the purge valve and (ii) a speed of the electrical pump.

In further features, the purge control module: determines a fuel vapor flow into the intake system at the first location based on the first pressure at the first location, the second pressure at the second location, and a target opening of the purge valve; and determines the fuel vapor flow into the cylinders as a function of a plurality of values of the fuel vapor flow into the intake system at the first location and the at least one delay period.

In further features, the purge control module: determines a pressure difference across the purge valve based on a difference between the first and second pressures; and determines the fuel vapor flow into the intake system at the first location based on the pressure difference and the target opening of the purge valve.

In further features, the at least one delay period includes: a first delay period between when the purge valve is opened and when the fuel vapor flow into the cylinders will begin to occur; and a second delay period between when the purge valve is opened and when the fuel vapor flow into the cylinders reaches steady-state.

In further features, the first delay period is a first predetermined number of combustion events and the second delay period is a second predetermined number of combustion events.

In further features, a throttle control module selectively adjusts opening of a throttle valve of the intake system of the engine based on the fuel vapor flow into the cylinders of the engine and a target air/fuel mixture.

In further features, a fuel control module controls liquid fuel injection for the cylinders of the engine based on the fuel vapor flow into the cylinders of the engine and a target air/fuel mixture.

In a feature, a control method for a vehicle includes: by a fuel vapor canister, trapping fuel vapor from a fuel tank of the vehicle; selectively opening a purge valve to allow fuel vapor flow into an intake system of an engine at a first location; selectively closing the purge valve to prevent fuel vapor flow to the intake system of the engine; and determining a fuel vapor flow into cylinders of the engine based on: (i) a first pressure at the first location, (ii) a second pressure at a second location between the purge valve and the intake system, and (iii) at least one delay period between opening of the purge valve and fuel vapor reaching cylinders of the engine.

In further features, the control method further includes: measuring the first pressure at the first location using a first pressure sensor at the first location, wherein the first location is between an air filter and a boost device that receives air from the air filter and that pumps air into an engine of the vehicle; and pumping, using an electrical pump, fuel vapor from the fuel vapor canister to the purge valve, wherein the second location is between the purge valve and the electrical pump.

In further features, the control method further includes measuring the second pressure at the second location using a second pressure sensor at the second location between the electrical pump and the purge valve.

In further features, the control method further includes, based on the second pressure at the second location, controlling at least one of (i) opening of the purge valve and (ii) a speed of the electrical pump.

In further features, the control method further includes: determining a fuel vapor flow into the intake system at the first location based on the first pressure at the first location, the second pressure at the second location, and a target opening of the purge valve; and determining the fuel vapor flow into the cylinders as a function of a plurality of values of the fuel vapor flow into the intake system at the first location and the at least one delay period.

In further features, the control method further includes: determining a pressure difference across the purge valve based on a difference between the first and second pressures; and determining the fuel vapor flow into the intake system at the first location based on the pressure difference and the target opening of the purge valve.

In further features, the at least one delay period includes: a first delay period between when the purge valve is opened and when the fuel vapor flow into the cylinders will begin to occur; and a second delay period between when the purge valve is opened and when the fuel vapor flow into the cylinders reaches steady-state.

In further features, the first delay period is a first predetermined number of combustion events and the second delay period is a second predetermined number of combustion events.

In further features, the control method further includes selectively adjusting opening of a throttle valve of the intake system of the engine based on the fuel vapor flow into the cylinders of the engine and a target air/fuel mixture.

In further features, the control method further includes controlling liquid fuel injection for the cylinders of the engine based on the fuel vapor flow into the cylinders of the engine and a target air/fuel mixture.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts a mixture of air and fuel to produce torque. Fuel injectors may inject liquid fuel drawn from a fuel tank. Some conditions, such as heat, radiation, and fuel type may cause fuel to vaporize within the fuel tank. A vapor canister traps fuel vapor, and the fuel vapor may be provided from the vapor canister through a purge valve to the engine. In naturally aspirated engines, vacuum within an intake manifold may be used to draw fuel vapor from the vapor canister when the purge valve is open.

According to the present application, an electrical pump pumps fuel vapor from the vapor canister to the purge valve and, when the purge valve is open, to the intake system. The electrical pump may pump fuel vapor, for example, to an intake system of the engine at a location upstream of a boost device of the engine. The electrical pump may be a fixed speed pump or a variable speed pump. A pressure sensor measures pressure at a location between the purge valve and the electrical pump.

A control module estimates a fuel vapor flow into the intake system. There is a propagation delay, however, between when the purge valve is opened and when the fuel vapor reaches the location where fuel vapor is introduced into the intake system. There is also a propagation delay between when the fuel vapor is introduced into the intake system and when fuel vapor flows into cylinders of the engine. The control module according to the present disclosure estimates fuel vapor flow into the cylinders based on previous values of fuel vapor flow into the intake system and the propagation delays. One or more engine operating parameters, such as liquid fuel injection and/or opening may be adjusted based on the fuel vapor flow into the cylinders, for example, to achieve a target air/fuel mixture.

Figure 1:
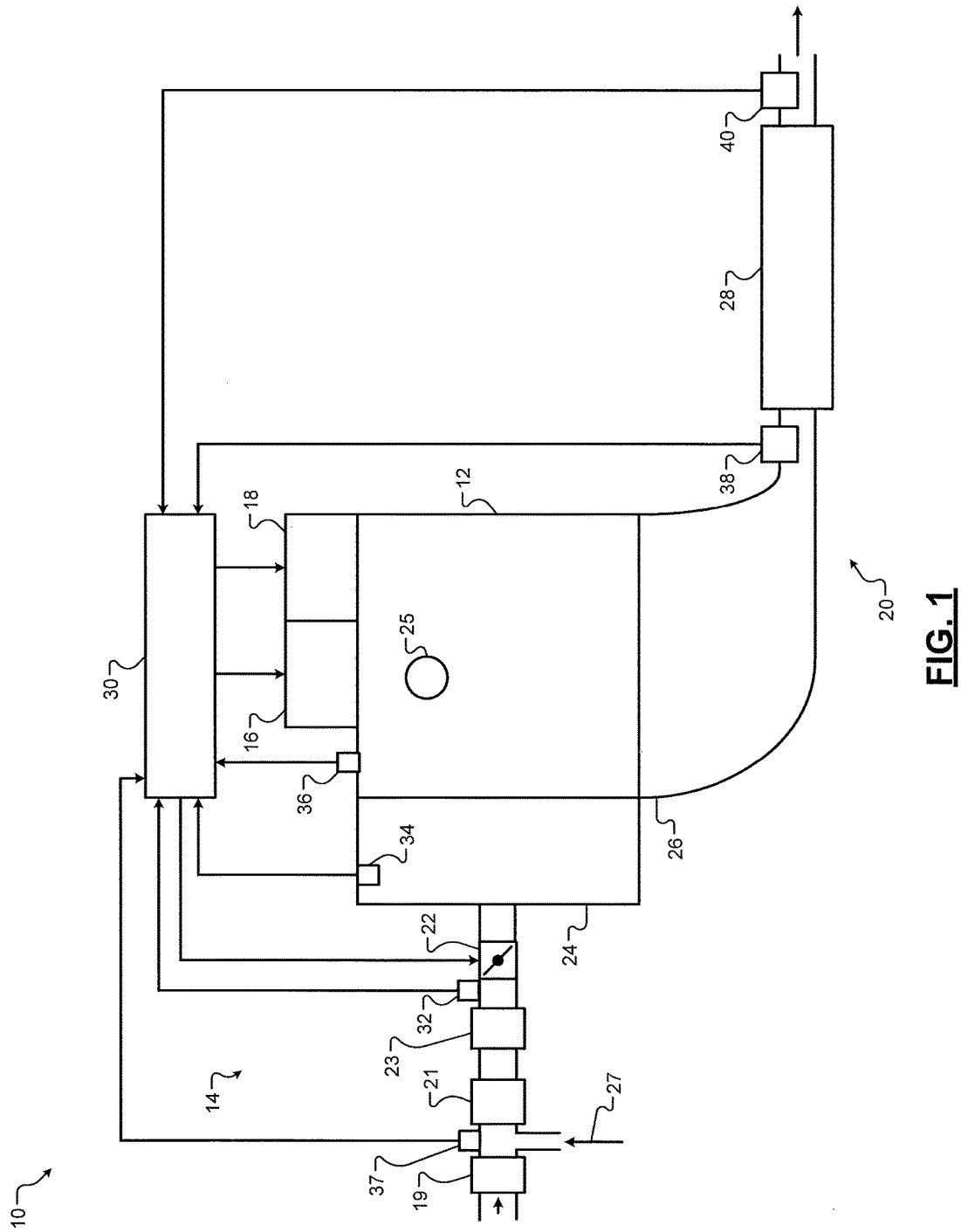
FIG. 1 is a functional block diagram of an example engine system.

Referring now to FIG. 1, a functional block diagram of an example engine system 10 is presented. The engine system 10 includes an engine 12, an intake system 14, a fuel injection system 16, a (spark) ignition system 18, and an exhaust system 20. While the engine system 10 is shown and will be described in terms of a gasoline engine, the present application is applicable to hybrid engine systems and other suitable types of engine systems having a fuel vapor purge system.

The intake system 14 may include an air filter 19, a boost device 21, a throttle valve 22, a charge cooler 23, and an intake manifold 24. The air filter 19 filters air flowing into the engine 12. The boost device 21 may be, for example, a turbocharger or a supercharger. While the example of one boost device is provided, more than 1 boost device may be included. The charge cooler 23 cools the gas output by the boost device 21.

The throttle valve 22 controls air flow into the intake manifold 24. Air flows from the intake manifold 24 into one or more cylinders within the engine 12, such as cylinder 25. While only the cylinder 25 is shown, the engine 12 may include more than one cylinder. The fuel injection system 16 includes a plurality of fuel injectors and controls (liquid) fuel injection for the engine 12. As discussed further below (e.g., see FIG. 2), fuel vapor 27 is also provided to the engine 12 under some circumstances. For example, the fuel vapor 27 may be introduced at a location between the air filter 19 and the boost device 21.

Exhaust resulting from combustion of the air/fuel mixture is expelled from the engine 12 to the exhaust system 20. The exhaust system 20 includes an exhaust manifold 26 and a catalyst 28. For example only, the catalyst 28 may include a three way catalyst (TWC) and/or another suitable type of catalyst. The catalyst 28 receives the exhaust output by the engine 12 and reacts with various components of the exhaust.

The engine system 10 also includes an engine control module (ECM) 30 that regulates operation of the engine system 10. The ECM 30 controls engine actuators, such as the boost device 21, the throttle valve 22, the intake system 14, the fuel injection system 16, and the ignition system 18. The ECM 30 also communicates with various sensors. For example only, the ECM 30 may communicate with a mass air flow (MAF) sensor 32, a manifold air pressure (MAP) sensor 34, a crankshaft position sensor 36, and other sensors.

The MAF sensor 32 measures a mass flowrate of air flowing through the throttle valve 22 and generates a MAF signal based on the mass flowrate. The MAP sensor 34 measures a pressure within the intake manifold 24 and generates a MAP signal based on the pressure. In some implementations, vacuum within the intake manifold 24 may be measured relative to ambient (barometric) pressure.

The crankshaft position sensor 36 monitors rotation of a crankshaft (not shown) of the engine 12 and generates a crankshaft position signal based on the rotation of the crankshaft. The crankshaft position signal may be used to determine an engine speed (e.g., in revolutions per minute). A barometric pressure sensor 37 measures barometric air pressure and generates a barometric air pressure signal based on the barometric air pressure. While the barometric pressure sensor 37 is illustrated as being separate from the intake system 14, the barometric pressure sensor 37 may be measured within the intake system 14, such as between the air filter 19 and the boost device 21 or upstream of the air filter 19.

The ECM 30 also communicates with exhaust gas oxygen (EGO) sensors associated with the exhaust system 20. For example only, the ECM 30 communicates with an upstream EGO sensor (US EGO sensor) 38 and a downstream EGO sensor (DS EGO sensor) 40. The US EGO sensor 38 is located upstream of the catalyst 28, and the DS EGO sensor 40 is located downstream of the catalyst 28. The US EGO sensor 38 may be located, for example, at a confluence point of exhaust runners (not shown) of the exhaust manifold 26 or at another suitable location.

The US and DS EGO sensors 38 and 40 measure amounts of oxygen in the exhaust at their respective locations and generate EGO signals based on the amounts of oxygen. For example only, the US EGO sensor 38 generates an upstream EGO (US EGO) signal based on the amount of oxygen upstream of the catalyst 28. The DS EGO sensor 40 generates a downstream EGO (DS EGO) signal based on the amount of oxygen downstream of the catalyst 28. The US and DS EGO sensors 38 and 40 may each include a switching EGO sensor, a universal EGO (UEGO) sensor (also referred to as a wide band or wide range EGO sensor), or another suitable type of EGO sensor. The ECM 30 may control the fuel injection system 16 based on measurements from the US and DS EGO sensors 38 and 40.

Figure 2:
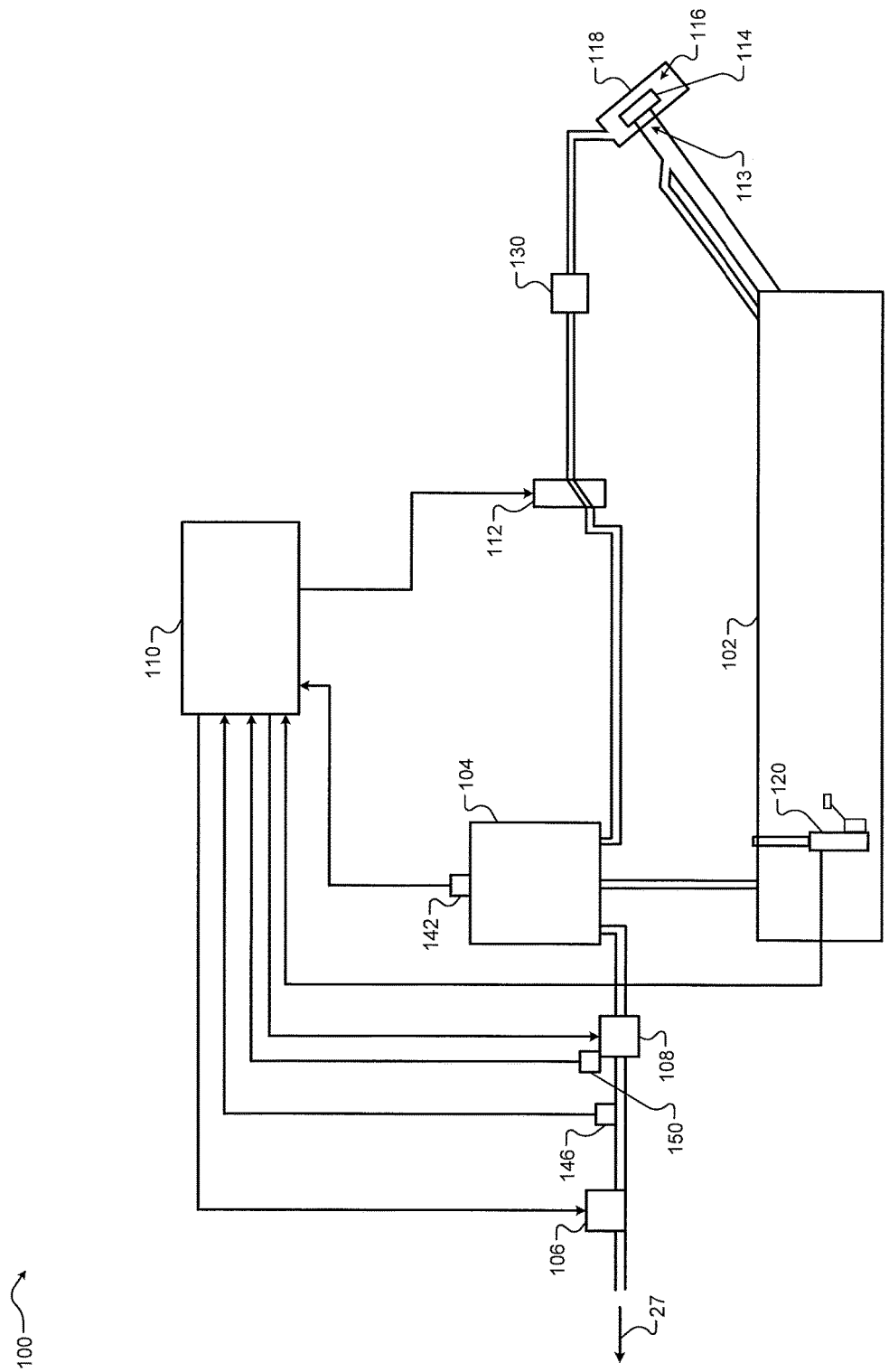
FIG. 2 is a functional block diagram of an example fuel control system.

Referring now to FIG. 2, a functional block diagram of an example fuel control system is presented. A fuel system 100 supplies liquid fuel and the fuel vapor to the engine 12. The fuel system 100 includes a fuel tank 102 that contains liquid fuel. One or more fuel pumps (not shown) draw liquid fuel from the fuel tank 102 and provide the fuel to the fuel injection system 16.

Some conditions, such as heat, vibration, and radiation, may cause liquid fuel within the fuel tank 102 to vaporize. A vapor canister 104 traps and stores vaporized fuel (i.e., the fuel vapor 27). The vapor canister 104 may include one or more substances that trap and store fuel vapor, such as one or more types of charcoal.

A purge valve 106 may be opened to allow fuel vapor flow from the vapor canister 104 to the intake system 14. More specifically, a purge pump 108 pumps fuel vapor from the vapor canister 104 to the purge valve 106. The purge valve 106 may be opened to allow the pressurized fuel vapor from the purge pump 108 to flow to the intake system 14. A purge control module 110 controls the purge valve 106 and the purge pump 108 to control the flow of fuel vapor to the engine 12. While the purge control module 110 and the ECM 30 are shown and discussed as being independent modules, the ECM 30 may include the purge control module 110.

The purge control module 110 also controls a vent valve 112. The purge control module 110 may open the vent valve 112 to a vent position when the purge pump 108 is on to draw fresh air toward the vapor canister 104. Fresh air is drawn into the vapor canister 104 through the vent valve 112 as fuel vapor flows from the vapor canister 104. The purge control module 110 controls fuel vapor flow to the intake system 14 by controlling the purge pump 108 and opening and closing of the purge valve 106 while the vent valve 112 is in the vent position. The purge pump 108 allows fuel vapor to flow without the need for vacuum within the intake system 14.

A driver of the vehicle may add liquid fuel to the fuel tank 102 via a fuel inlet 113. A fuel cap 114 seals the fuel inlet 113. The fuel cap 114 and the fuel inlet 113 may be accessed via a fueling compartment 116. A fuel door 118 may be implemented to shield and close the fueling compartment 116.

A fuel level sensor 120 measures an amount of liquid fuel within the fuel tank 102. The fuel level sensor 120 generates a fuel level signal based on the amount of liquid fuel within the fuel tank 102. For example only, the amount of liquid fuel in the fuel tank 102 may be expressed as a volume, a percentage of a maximum volume of the fuel tank 102, or another suitable measure of the amount of fuel in the fuel tank 102.

The fresh air provided to the vapor canister 104 through the vent valve 112 may be drawn from the fueling compartment 116 in various implementations, although the vent valve 112 may draw fresh air from another suitable location. A filter 130 may be implemented to filter various particulate from the ambient air flowing to the vent valve 112. A tank pressure sensor 142 measures a tank pressure within the fuel tank 102. The tank pressure sensor 142 generates a tank pressure signal based on the tank pressure within the fuel tank 102.

A purge pressure sensor 146 measures a purge pressure at a location between the purge pump 108 and the purge valve 106. The purge pressure sensor 146 generates a purge pressure signal based on the purge pressure at the location between the purge pump 108 and the purge valve 106.

The purge pump 108 is an electrical pump and includes an electrical motor that drives the purge pump 108. The purge pump 108 is not a mechanical pump that is driven by a rotating component of the vehicle, such as the crankshaft of the engine. The purge pump 108 may be a fixed speed pump or a variable speed pump. While the example of using the purge pump 108 is provided, the present application is also applicable to fuel vapor purge systems that do not include a purge pump. Also, while the example of providing fuel vapor upstream of the throttle valve 22 is provided, fuel vapor may additionally or alternatively be provided downstream of the throttle valve 22 with or without the use of a purge pump. In various implementations, vacuum or pressure created by the boost device 21 (e.g., turbocharger compressor) may be used to facilitate fuel vapor flow to upstream of the boost device 21.

One or more pump sensors 150 measure operating parameters of the purge pump 108 and generate signals accordingly. For example, the pump sensors 150 include a pump speed sensor that measures a rotational speed of the purge pump 108 and generates a pump speed signal based on the speed of the purge pump 108. The pump sensors 150 may also include a pump current sensor, a pump voltage sensor, and/or a pump power sensor. The pump current sensor, the pump voltage sensor, and the pump power sensor measure current to the purge pump 108, voltage applied to the purge pump 108, and power consumption of the purge pump 108, respectively.

Figure 3:
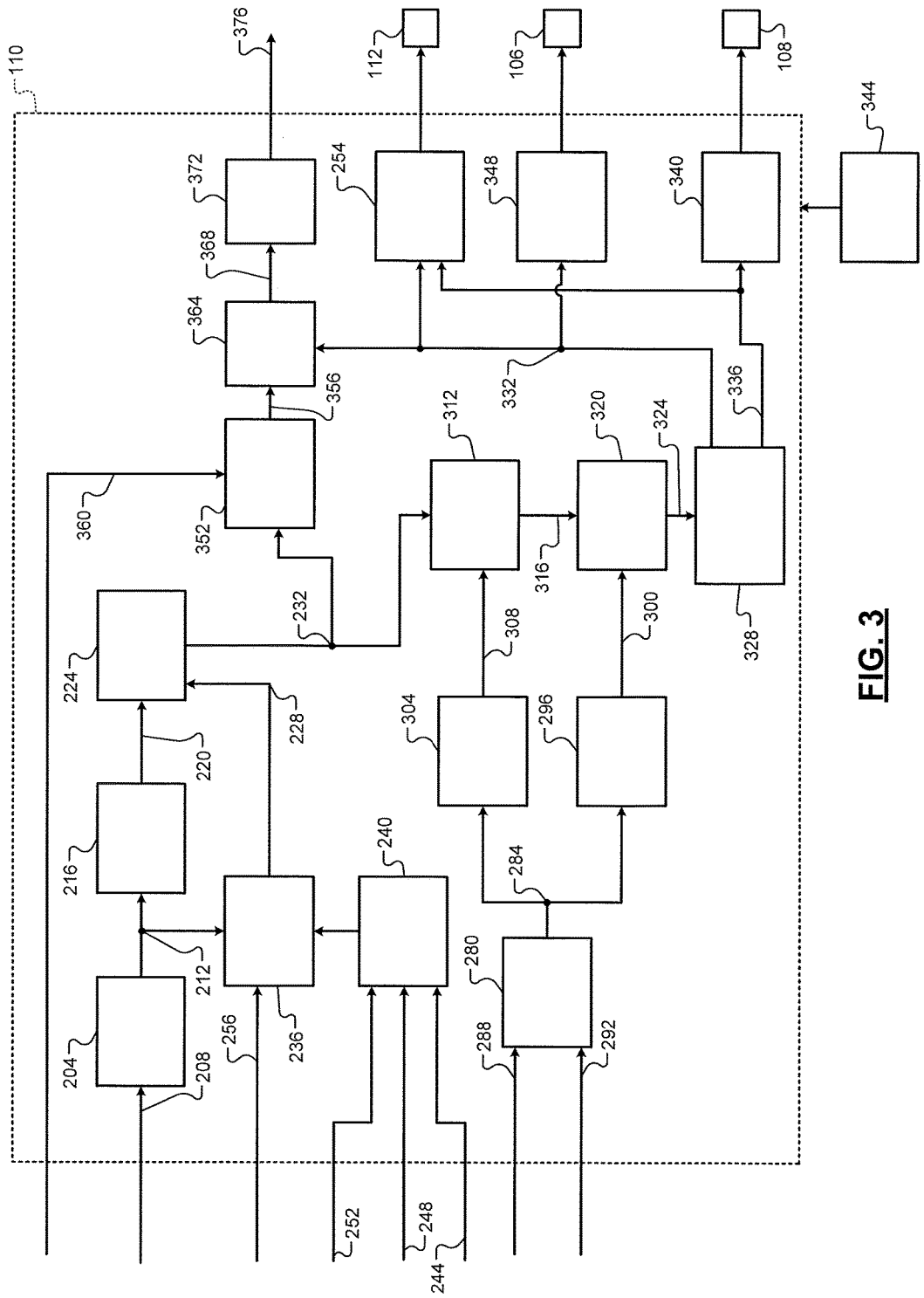
FIG. 3 if a functional block diagram of an example implementation of a purge control module.

Referring now to FIG. 3, a functional block diagram of an example implementation of the purge control module 110 is presented. A sampling module 204 samples the purge pressure signal 208 from the purge pressure sensor 146 at a predetermined sampling rate and outputs purge pressure samples 212. The sampling module 204 may also digitize, buffer, filter, and/or perform one or more functions on the samples. In various implementations, the purge pressure sensor 146 may perform the functions of the sampling module 204 and provide the purge pressure 212.

A filtering module 216 filters the purge pressure 212 using one or more filters to produce a filtered purge pressure 220. For example only, the filtering module 216 may apply a low pass filter or a first-order lag filter to the purge pressure samples to produce the filtered purge pressure 220.

The measurements of the purge pressure sensor 146 may drift over time. In other words, the purge pressure signal 208 may be different than expected given actual pressure. An adjusting module 224 therefore adjusts the filtered purge pressure 220 based on a pressure offset 228 to produce adjusted purge pressure 232. For example only, the adjusting module 224 may sum or multiply the pressure offset 228 with the filtered purge pressure 220 to produce the adjusted purge pressure 232. As discussed further below, the adjusted purge pressure 232 may be used, for example, to control opening of the purge valve 106 and/or to control the purge pump 108. While the example sequence of sampling, filtering, and adjusting based on the pressure offset 228 have been provided, another sequence may be used.

When triggered, an offset module 236 determines the pressure offset 228. A triggering module 240 triggers the offset module 236 when the purge pressure at the location of the purge pressure sensor 146 should be at an expected pressure, such as barometric pressure.

For example, the triggering module 240 may trigger the offset module 236 when a driver actuates an ignition key, button, or switch to start the vehicle, before engine cranking begins, and the engine 12 was off (shut down) for at least a predetermined period before the driver actuation of the ignition system. Additionally or alternatively, the triggering module 240 may trigger the offset module 236 when the purge pump 108 has been off for greater than the predetermined period and/or the speed of the purge pump 108 is zero or approximately zero. An ignition signal 244 may indicate driver actuation of the ignition key, button, or switch. An engine off period 248 may correspond to a period that the engine 12 was off between a time when the driver actuated the ignition key, button, or switch, and a last time when the driver shut down the engine 12. The predetermined period may be set based on a period for the pressure at the purge pressure sensor 146 to reach the expected (e.g., barometric) pressure.

An engine speed 252 corresponds to a rotation speed of the engine 12 (e.g., the crankshaft) and may be determined, for example, based on crankshaft position measured using the crankshaft position sensor 36. The engine speed 252 being zero or less than a predetermined speed may indicate that engine cranking has not yet begun. A vent valve control module 254 may actuate the vent valve 112 to the vent position when the engine 12 is off to allow the pressure at the purge pressure sensor 146 to approach barometric pressure.

When triggered, the offset module 236 may set the pressure offset 228, for example, based on or equal to a difference between the purge pressure 212 and barometric pressure 256. The pressure offset 228 therefore corresponds to how far the purge pressure 212 may be from an actual pressure at the purge pressure sensor 146 at that time. The barometric pressure 256 may be measured, for example, using the barometric pressure sensor 37. In various implementations, a predetermined pressure may be used in place of the barometric pressure 256. In various implementations, pressure measured by the tank pressure sensor 142 may be used in place of the barometric pressure 256. The offset module 236 may also filter the pressure offset 228 before outputting the pressure offset 228. For example, the offset module 236 may apply a first-order lag filter, a weighted moving average filter (e.g., an exponentially weighted moving average filter), or another suitable type of filter.

A target flow module 280 determines a target purge flow rate 284 to the engine 12. The target purge flow rate 284 may correspond, for example, to a target mass flow rate of fuel vapor through the purge valve 106. The target flow module 280 may determine the target purge flow rate 284, for example, based on a mass air flowrate (MAF) 288 and one or more fueling parameters 292. The target flow module 280 may determine the target purge flow rate 284, for example, using one or more functions or mappings that relate MAFs and fueling parameter(s) to target purge flow rate. The fueling parameters 292 may include, for example, a mass of (liquid) fuel injected per combustion event, a mass of air trapped within a cylinder per combustion event, a target air/fuel mixture, and/or one or more other fueling parameters. The fueling parameter(s) 292 may be provided, for example, by a fuel control module of the ECM 30 that controls the fuel injection system 16.

A feed forward (FF) module 296 determines a FF value 300 based on the target purge flow rate 284. In one example, the FF value 300 is a target purge flow rate through the purge valve 106. The FF module 296 may determine the FF value 300, for example, using a function or a mapping that relates target purge flow rates to FF values. The FF module 296 may determine the FF value 300 based on one or more other parameters, such as a composition (e.g., amount of butane) of the fuel vapor. The function or mapping may also relate the one or more other parameters to FF values.

A target purge pressure module 304 determines a target purge pressure 308 based on the target purge flow rate 284. The target purge pressure 308 also corresponds to a target pressure at the purge pressure sensor 146. The target purge pressure module 304 may determine the target purge pressure 308, for example, using a function or a mapping that relates target purge flow rates to target purge pressures. The target purge pressure 308, however, will be used for closed loop control.

A closed loop (CL) module 312 determines a CL adjustment value 316 based on a difference between the target purge pressure 308 and the adjusted purge pressure 232 for a given control loop. The CL module 312 determines the CL adjustment value 316 using a CL controller, such as a proportional integral (PI) CL controller, a proportional, integral, derivative (PID) CL controller, or another suitable type of CL controller.

A summer module 320 determines a final target value 324 based on the CL adjustment value 316 and the FF value 300. For example, the summer module 320 may set the final target value 324 based on or equal to a sum of the CL adjustment value 316 and the FF value 300. In the example of the FF value 300 being a flow rate through the purge valve 106, the final target value 324 is also a target flow rate through the purge valve 106.

A target determination module 328 determines targets for opening of the purge valve 106 and for controlling the purge pump 108 based on the final target value 324. The target determination module 328 determines the targets collectively based on the final target value 324 since both the output of the purge pump 108 and opening of the purge valve 106 both affect the pressure at the purge pressure sensor 146.

For example, the target determination module 328 may determine a target effective opening 332 of the purge valve 106 and a target speed 336 of the purge pump 108 based on the final target value 324. The target determination module 328 may determine the target effective opening 332 and the target speed 336 using one or more functions or mappings that relate final target values to target effective openings and target speeds. As stated above, in some implementations, the purge pump 108 may be a fixed speed pump. In such implementations, the target determination module 328 may set the target speed 336 to the predetermined fixed speed and determine the target effective opening 332 based on the final target value 324 given the use of the predetermined fixed speed.

A motor control module 340 controls application of electrical power to the electric motor of the purge pump 108 based on the target speed 336. For example, the motor control module 340 may control switching of a motor driver (not shown), such as an inverter, based on the target speed 336. Power may be provided to the purge pump 108, for example, from a battery 344 or another energy storage device of the vehicle.

The target effective opening 332 may correspond to a value between 0 percent (for maintaining the purge valve 106 closed) and 100 percent (for maintaining the purge valve 106 open). A purge valve control module 348 controls application of electrical power, such as from the battery 344, to the purge valve 106 based on the target effective opening 332.

For example, the purge valve control module 348 may determine a target duty cycle to be applied to the purge valve 106 based on the target effective opening 332. The purge valve control module 348 may determine the target duty cycle, for example, using a function or mapping that relates target effective openings to target duty cycles. In the example where the target effective opening 332 corresponds to a percentage between 0 and 100 percent, the purge valve control module 348 may use the target effective opening 332 as the target duty cycle. The purge valve control module 348 applies power to the purge valve 106 at the target duty cycle.

The vent valve control module 254 may open the vent valve 112, for example, when the purge valve 106 is open and the purge pump 108 is turned on. For example, the vent valve control module 254 may open the vent valve 112 when the target effective opening 332 is greater than zero and/or the target speed 336 is greater than zero. Opening the vent valve 112 allows fresh air to flow into the vapor canister 104 while the purge pump 108 pumps purge vapor from the vapor canister 104 through the purge valve 106 to the intake system 14.

A pressure difference module 352 determines a pressure difference 356 across the purge valve 106 based on a difference between the adjusted purge pressure 232 and an intake pressure 360. The pressure difference 356 may also be referred to as a pressure delta (or delta pressure). The intake pressure 360 corresponds to a pressure at an outlet of the purge valve 106. The intake pressure 360 may be measured, for example, using the barometric pressure sensor 37 at a location between the air filter 19 and the boost device 21 where fuel vapor is introduced to the intake system 14. The intake pressure 360 may be the same as the barometric pressure 256 in such implementations.

A first mass fraction module 364 determines a first fuel vapor mass fraction 368 at the location where fuel vapor is introduced into the intake system 14 based on the pressure difference 356 and the target effective opening 332 of the purge valve 106. The first fuel vapor mass fraction 368 corresponds to a ratio of (i) the mass of fuel vapor flowing into the intake system 14 at the location where fuel vapor is introduced into the intake system 14 to (ii) the total mass of gasses at that location. The total mass may include, for example, the mass of fuel vapor, a mass of fresh air and/or masses of one or more other types of gas (e.g., recirculated exhaust gas) at that location.

If fuel vapor was introduced into the intake system 14 at the intake manifold 24, a delay period between when fuel vapor reaches the intake manifold 24 and when that fuel vapor later flows through an intake valve of a cylinder may be minimal. The first fuel vapor mass fraction 368 could be filtered, for example using a first-order lag filter, to estimate fuel vapor flow through an intake valve of a cylinder in such a case.

Since fuel vapor is introduced further upstream according to the present application, however, the delay period between introduction of fuel vapor into the intake system 14 and that fuel vapor entering a cylinder is longer. Therefore, a second mass fraction module 372 determines a second fuel vapor mass fraction 376 based on the first fuel vapor mass fraction 368, a plurality of previous values of the first fuel vapor mass fraction 368, and delays. The second fuel vapor mass fraction 376 corresponds to a ratio of (i) the mass of fuel vapor flowing into a cylinder for the next combustion event to (ii) the total mass of gasses flowing into that cylinder for the next combustion event.

The second mass fraction module 372 determines the second fuel vapor mass fraction 376 using one or more functions or mappings that relate first fuel vapor mass fractions and delays to second fuel vapor mass fractions. For example, the second mass fraction module 372 may determine the second fuel vapor mass fraction 376 for the next combustion event using the equation:

$$FVMF2 = \frac{\left(\sum_{i=0}^{t-d} (t-d-i) * FVMF1_{t-1-i}\right)}{\left(\sum_{i=0}^{t-d} (t-d-i)\right)},$$

where FVMF2 is the second fuel vapor mass fraction 376, t is a delay period (e.g., number of combustion events) between when the purge valve 106 is first opened and when the second fuel vapor mass fraction 376 (i.e., the mass fraction of fuel vapor flowing into the cylinders) will reach steady-state, d is a delay period (e.g., a number of combustion events) between when the purge valve 106 is first opened and when the second fuel vapor mass fraction 376 will begin to increase in response to the opening of the purge valve 106, and FVMF1 refers to one of the values of the first fuel vapor mass fraction 368 for the combustion event t−1−i combustion events earlier. The delay periods t and d are integers, and d is less than t. The delay periods t and d may be constant values that are calibrated based on physical factors, such as cylinder volume, volume of the intake manifold 24, and volume of flow paths through which fuel vapor flows before entering a cylinder. In various implementations, the delay periods t and/or d may be variable values and may be set by the second mass fraction module 372. The second mass fraction module 372 may set the delay periods t and/or d, for example, using one or more functions or mappings that relate engine loads and/or engine speeds to t and/or d. The one or more functions or mappings may be calibrated based on the physical factors provided above.

Figure 4:
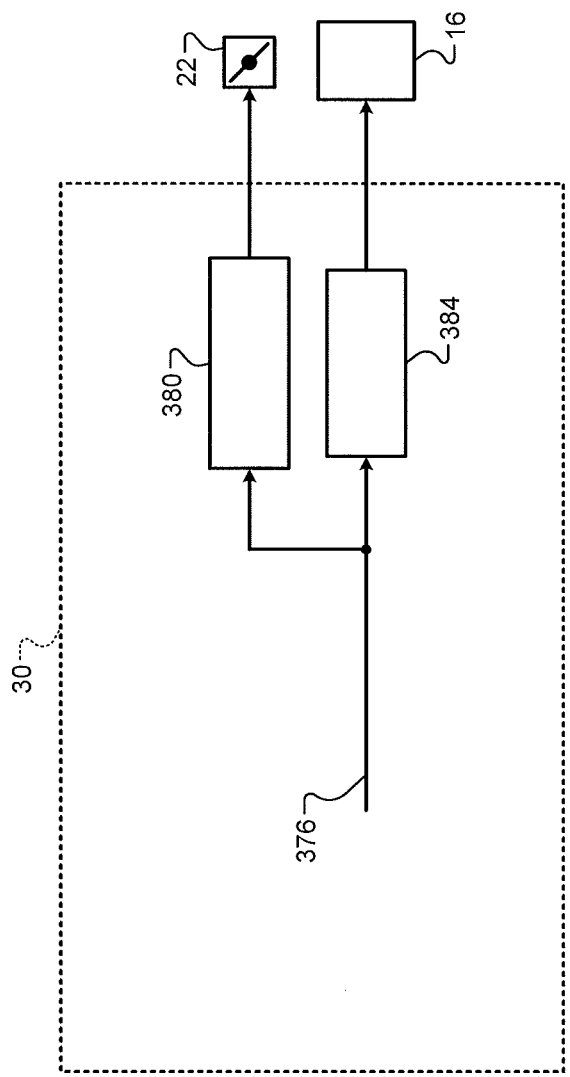
FIG. 4 is a functional block diagram including an example implementation of a portion of an engine control module.

One or more engine operating parameters may be controlled or adjusted based on the second fuel vapor mass fraction 376. For example, FIG. 4 includes a functional block diagram of an example portion of the ECM 30. A throttle control module 380 may control opening of the throttle valve 22 based on the second fuel vapor mass fraction 376. For example, the throttle control module 380 may adjust opening of the throttle valve 22 based on a target air/fuel mixture given the second fuel vapor mass fraction 376 and a mass of liquid fuel injection. Additionally or alternatively, a fuel control module 384 may control the mass of liquid fuel injection based on the target air/fuel mixture given the second fuel vapor mass fraction 376. While the examples of controlling the throttle valve 22 and/or fuel injection based on the second fuel vapor mass fraction 376 have been provided, one or more other engine operating parameters may be additionally or alternatively controlled based on the second fuel vapor mass fraction 376.

Figure 5:
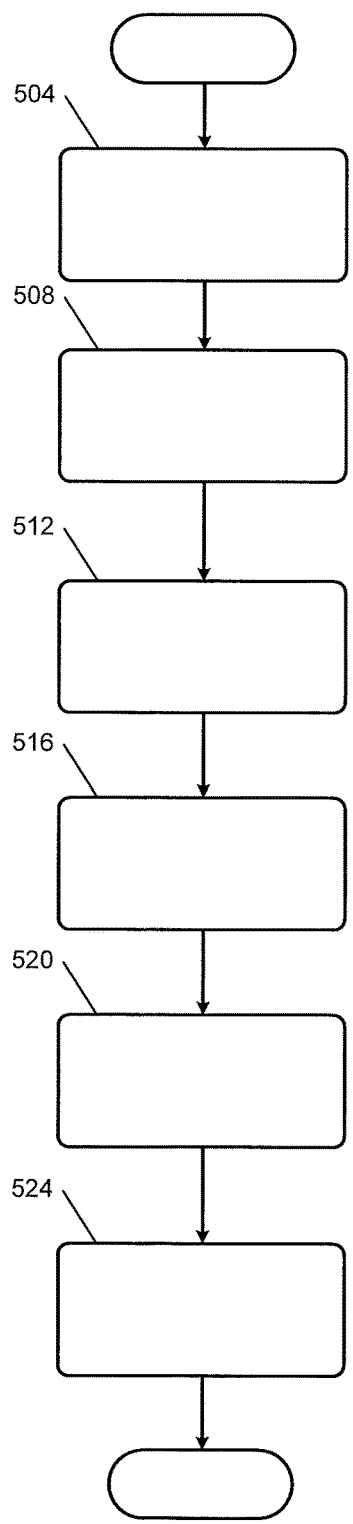
FIG. 5 includes a flowchart depicting an example method of controlling the purge valve and the purge pump.

FIG. 5 includes a flowchart depicting an example method of controlling the purge valve 106 and the purge pump 108. Control begins with 504 where the adjusting module 224 determines the adjusted purge pressure 232, as discussed above. At 508, the target flow module 280 determines the target purge flow rate 284 based on the MAF 288 and the fueling parameter(s) 292. At 512, the target purge pressure module 304 and the FF module 296 determine the target purge pressure 308 and the FF value 300, respectively, based on the target purge flow rate 284.

At 516, the CL module 312 determines the CL adjustment value 316 based on a difference between the target purge pressure 308 and the adjusted purge pressure 232. The summer module 320 determines the final target value 324 based on the CL adjustment value 316 and the FF value 300 at 520. For example, the summer module 320 may set the final target value 324 based on or equal to the CL adjustment value 316 and the FF value 300.

At 524, the target determination module 328 may determine the target effective opening 332 for the purge valve 106 and the target speed 336 for the purge pump 108 based on the final target value 324. The purge valve control module 348 controls opening of the purge valve 106 based on the target effective opening 332, and the motor control module 340 controls the speed of the purge pump 108 based on the target speed 336. The example of FIG. 5 may be illustrative of one control loop, and control loops may be started at the predetermined rate.

Figure 6:
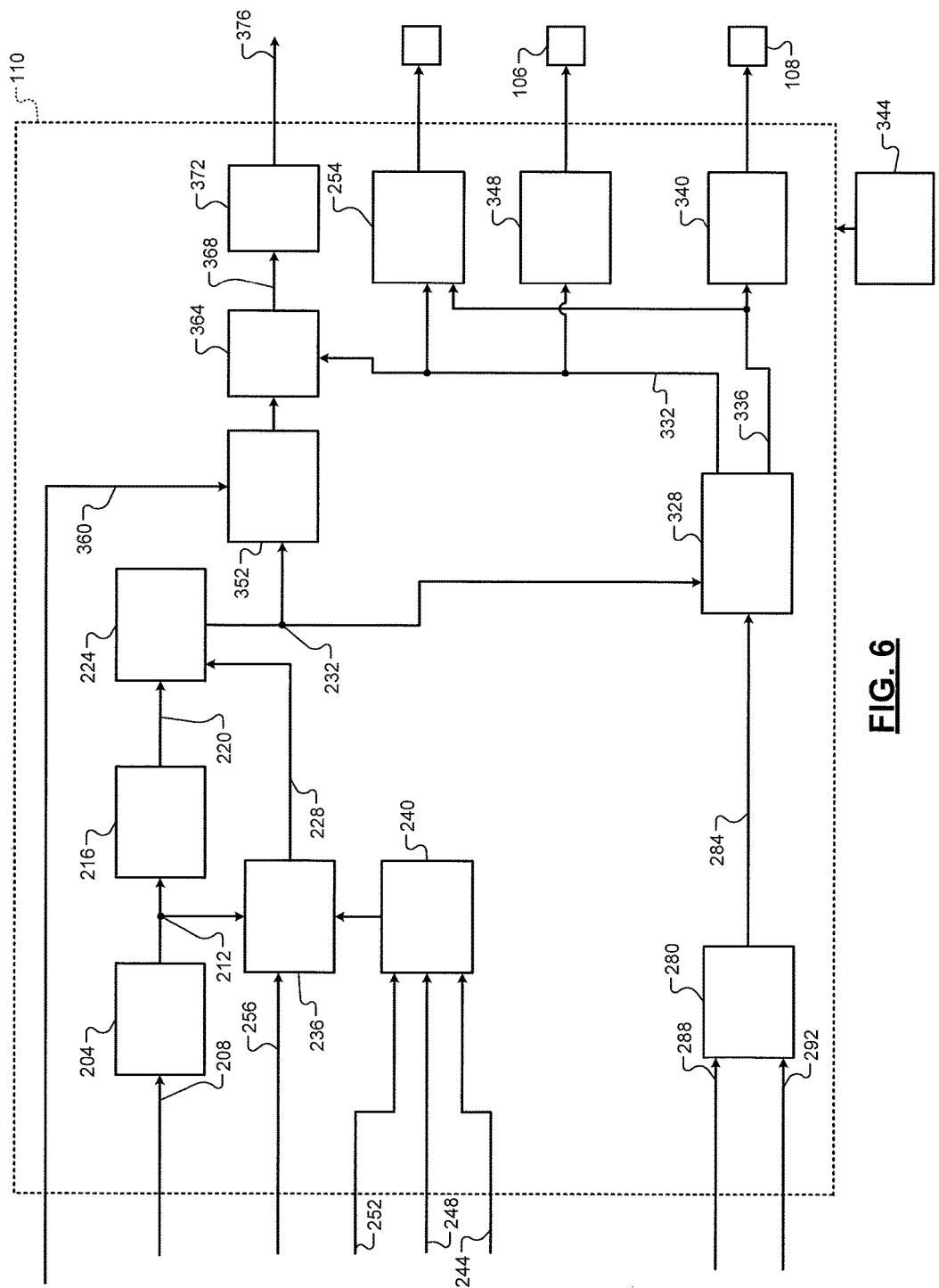
FIG. 6 includes a functional block diagram of an example implementation of a purge control module.

FIG. 6 includes a functional block diagram of an example implementation of the purge control module 110. The example of FIG. 6 provides a system without CL control. The target flow module 280 determines the target purge flow rate 284, as discussed above.

In the example of FIG. 6, the target determination module 328 determines targets for opening of the purge valve 106 and for controlling the purge pump 108 based on the target purge flow rate 284. The target determination module 328 may determine the targets for opening the purge valve 106 and for controlling the purge pump 108 further based on the adjusted purge pressure 232. The target determination module 328 determines the targets collectively since both the output of the purge pump 108 and opening of the purge valve 106 both affect the pressure at the purge pressure sensor 146.

For example, the target determination module 328 may determine the target effective opening 332 of the purge valve 106 and the target speed 336 of the purge pump 108 based on the target purge flow rate 284 and, optionally, the adjusted purge pressure 232. The target determination module 328 may determine the target effective opening 332 and the target speed 336 using one or more functions or mappings that relate target purge flow rates and, optionally adjusted purge pressures, to target effective openings and target speeds. As stated above, in some implementations, the purge pump 108 may be a fixed speed pump. In such implementations, the target determination module 328 may set the target speed 336 to the predetermined fixed speed and determine the target effective opening 332 based on the target purge flow rate 284 and optionally the adjusted purge pressure 232 given the use of the predetermined fixed speed.

Figure 7:
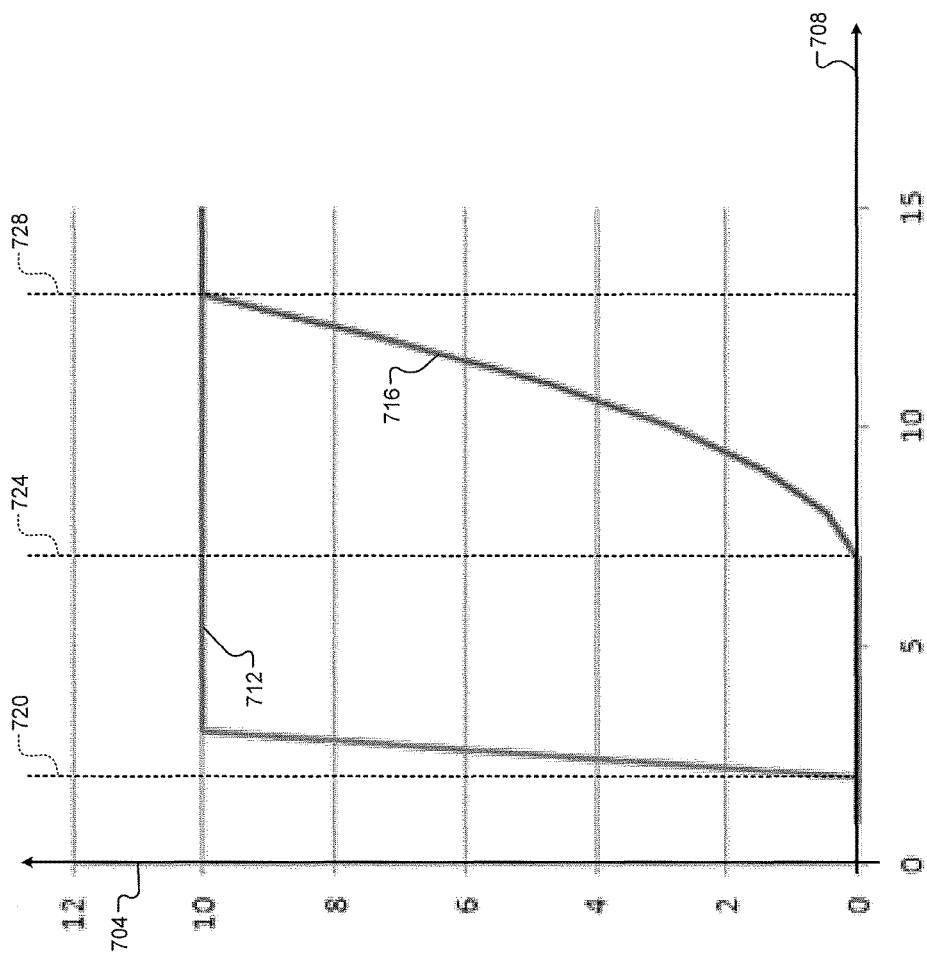
FIG. 7 includes an example graph of fuel vapor mass fraction versus time after opening of a purge valve.

FIG. 7 includes an example graph of fuel vapor mass fraction 704 over a number of combustion events 708. Trace 712 tracks mass fraction of fuel vapor at the location where fuel vapor is introduced into the intake system 14. Trace 716 tracks fuel vapor mass fraction into cylinders.

The purge valve 106 is first opened at approximately time 720. Fuel vapor mass fraction into the cylinders begins to increase at approximately time 724 in response to the opening of the purge valve 106. The period between time 720 and time 724 may correspond to d in the equation above. At approximately time 728, fuel vapor mass fraction into the cylinders reaches approximately steady state or equilibrium with the (initial) fuel vapor flow into the intake system 14. The period between time 724 and time 728 may correspond to t in the equation above.

Figure 8:
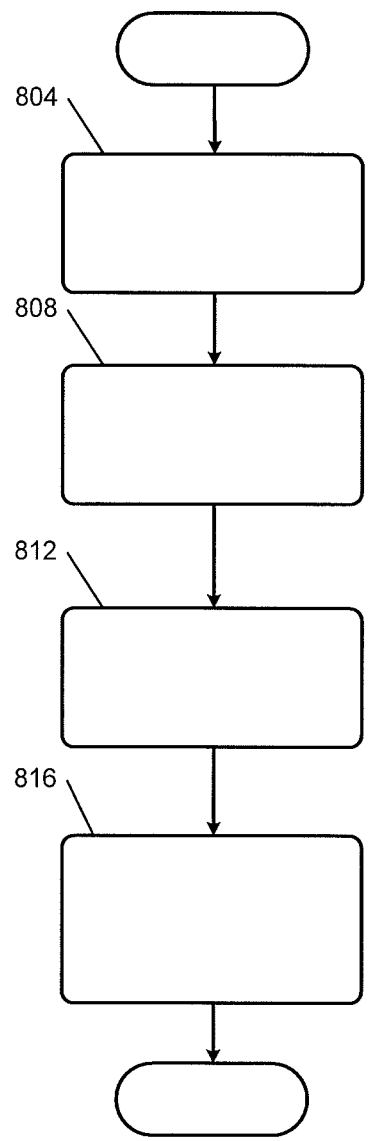
FIG. 8 is a flowchart depicting an example method of determining fuel vapor flow into cylinders and controlling engine operation.

FIG. 8 includes a flowchart depicting an example method of determining fuel vapor mass flow into cylinders and controlling engine operation based on the fuel vapor flow. Control may begin with 804 where the pressure difference module 352 determines the pressure difference 356 across the purge valve 106. The pressure difference module 352 sets the pressure difference 356 based on or equal to a difference between the adjusted purge pressure 232 and the intake pressure 360.

At 808, the first mass fraction module 364 determines the first fuel vapor mass fraction 368. The first mass fraction module 364 determines the first fuel vapor mass fraction 368 based on the pressure difference 356 and the target effective opening 332 of the purge valve 106, as discussed above. The first fuel vapor mass fraction 368 corresponds to a ratio of the mass of fuel vapor flowing into the intake system 14 at the location where fuel vapor is introduced into the intake system 14 to the total mass of gasses at that location.

The second mass fraction module 372 determines the second fuel vapor mass fraction 376 at 812. The second mass fraction module 372 determines the second fuel vapor mass fraction 376 based on the first fuel vapor mass fraction 368, a plurality of previous values of the first fuel vapor mass fraction 368, and the delays. The second fuel vapor mass fraction 376 corresponds to a ratio of the mass of fuel vapor flowing into a cylinder for the next combustion event to the total mass of gasses flowing into that cylinder for the next combustion event. For example, the second mass fraction module 372 may determine the second fuel vapor mass fraction 376 for the next combustion event using the equation:

$$FVMF2 = \frac{\left(\sum_{i=0}^{t-d}(t-d-i)*FVMF1_{t-1-i}\right)}{\left(\sum_{i=0}^{t-d}(t-d-i)\right)},$$

where FVMF2 is the second fuel vapor mass fraction 376, t is a delay period (e.g., number of combustion events) between when the purge valve 106 is first opened and when the second fuel vapor mass fraction 376 (i.e., the mass fraction of fuel vapor flowing into the cylinders) will reach steady-state, d is a delay period (e.g., a number of combustion events) between when the purge valve 106 is first opened and when the second fuel vapor mass fraction 376 will begin to increase in response to the opening of the purge valve 106, and FVMF1 refers to one of the values of the first fuel vapor mass fraction 368 for the combustion event t−1−i combustion events earlier.

One or more engine operating parameters are controlled or adjusted based on the second fuel vapor mass fraction 376 at 816. For example, the throttle control module 380 may control opening of the throttle valve 22 based on the second fuel vapor mass fraction 376. Additionally or alternatively, the fuel control module 384 may control the mass of liquid fuel injection based on the second fuel vapor mass fraction 376. One or more other engine operating parameters may additionally or alternatively be controlled based on the second fuel vapor mass fraction 376. The example of FIG. 8 may be illustrative of one control loop, and control loops may be started at the predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A control system of a vehicle, comprising:
   a fuel vapor canister that traps fuel vapor from a fuel tank of the vehicle;
   a purge valve that, when open, allows fuel vapor flow into an intake system of an engine at a first location and that, when closed, prevents fuel vapor flow to the intake system of the engine;
   a boost device of the intake system is configured to receive air from an air filter and pump air into the engine of the vehicle,
   wherein the first location is between the air filter and the boost device;
   an electrical pump configured to receive fuel vapor from the fuel vapor canister and to pump fuel vapor to the purge valve; and
   a purge control module configured to control opening of the purge valve and to determine a fuel vapor flow into cylinders of the engine based on: (i) a first pressure at the first location, (ii) a second pressure at a second location between the purge valve and the electrical pump, and (iii) at least one delay period between opening of the purge valve and fuel vapor reaching cylinders of the engine.

2. The control system of claim 1 further comprising:
   a first pressure sensor configured to measure the first pressure at the first location between the air filter and the boost device.

3. The control system of claim 1 further comprising a second pressure sensor configured to measure the second pressure at the second location between the electrical pump and the purge valve.

4. The control system of claim 1 wherein, based on the second pressure at the second location, the purge control module is configured to control at least one of (i) opening of the purge valve and (ii) a speed of the electrical pump.

5. The control system of claim 1 wherein the purge control module is configured to:
   determine a fuel vapor flow into the intake system at the first location based on the first pressure at the first location, the second pressure at the second location, and a target opening of the purge valve; and
   determine the fuel vapor flow into the cylinders as a function of a plurality of values of the fuel vapor flow into the intake system at the first location and the at least one delay period.

6. The control system of claim 5 wherein the purge control module is configured to:
   determine a pressure difference across the purge valve based on a difference between the first and second pressures; and
   determine the fuel vapor flow into the intake system at the first location based on the pressure difference and the target opening of the purge valve.

7. The control system of claim 1 wherein the at least one delay period includes: a first delay period between when the purge valve is opened and when the fuel vapor flow into the cylinders will begin to occur; and a second delay period between when the purge valve is opened and when the fuel vapor flow into the cylinders reaches steady-state, wherein the first delay period is a first predetermined number of combustion events and the second delay period is a second predetermined number of combustion events.

8. A system comprising:
   the control system of claim 1; and
   a throttle control module configured to selectively adjust opening of a throttle valve of the intake system of the engine based on the fuel vapor flow into the cylinders of the engine and a target air/fuel mixture.

9. A system comprising:
   the control system of claim 1; and
   a fuel control module configured to control liquid fuel injection for the cylinders of the engine based on the fuel vapor flow into the cylinders of the engine and a target air/fuel mixture.

10. A control method for a vehicle, comprising:
    by a fuel vapor canister, trapping fuel vapor from a fuel tank of the vehicle;
    selectively opening a purge valve to allow fuel vapor flow into an intake system of an engine at a first location;
    selectively closing the purge valve to prevent fuel vapor flow to the intake system of the engine;
    by a boost device of the intake system receiving air from an air filter and pumping air into the engine of the vehicle,
    wherein the first location is between the air filter and the boost device;
    by an electrical pump, receiving fuel vapor from the fuel vapor canister and pumping fuel vapor to the purge valve; and determining a fuel vapor flow into cylinders of the engine based on: (i) a first pressure at the first location, (ii) a second pressure at a second location between the purge valve and the electrical pump, and (iii) at least one delay period between opening of the purge valve and fuel vapor reaching cylinders of the engine.

11. The control method of claim 10 further comprising:
measuring the first pressure at the first location using a first pressure sensor at the first location.

12. The control method of claim 10 further comprising measuring the second pressure at the second location using a second pressure sensor at the second location between the electrical pump and the purge valve.

13. The control method of claim 10 further comprising, based on the second pressure at the second location, controlling at least one of (i) opening of the purge valve and (ii) a speed of the electrical pump.

14. The control method of claim 10 further comprising:
determining a fuel vapor flow into the intake system at the first location based on the first pressure at the first location, the second pressure at the second location, and a target opening of the purge valve; and
determining the fuel vapor flow into the cylinders as a function of a plurality of values of the fuel vapor flow into the intake system at the first location and the at least one delay period.

15. The control method of claim 14 further comprising:
determining a pressure difference across the purge valve based on a difference between the first and second pressures; and
determining the fuel vapor flow into the intake system at the first location based on the pressure difference and the target opening of the purge valve.

16. The control method of claim 10 wherein the at least one delay period includes:
a first delay period between when the purge valve is opened and when the fuel vapor flow into the cylinders will begin to occur; and
a second delay period between when the purge valve is opened and when the fuel vapor flow into the cylinders reaches steady-state.

17. The control method of claim 16 wherein the first delay period is a first predetermined number of combustion events and the second delay period is a second predetermined number of combustion events.

18. The control method of claim 10 further comprising selectively adjusting opening of a throttle valve of the intake system of the engine based on the fuel vapor flow into the cylinders of the engine and a target air/fuel mixture.

19. The control method of claim 10 further comprising controlling liquid fuel injection for the cylinders of the engine based on the fuel vapor flow into the cylinders of the engine and a target air/fuel mixture.

* * * * *